United States Patent Office 3,489,000
Patented Jan. 13, 1970

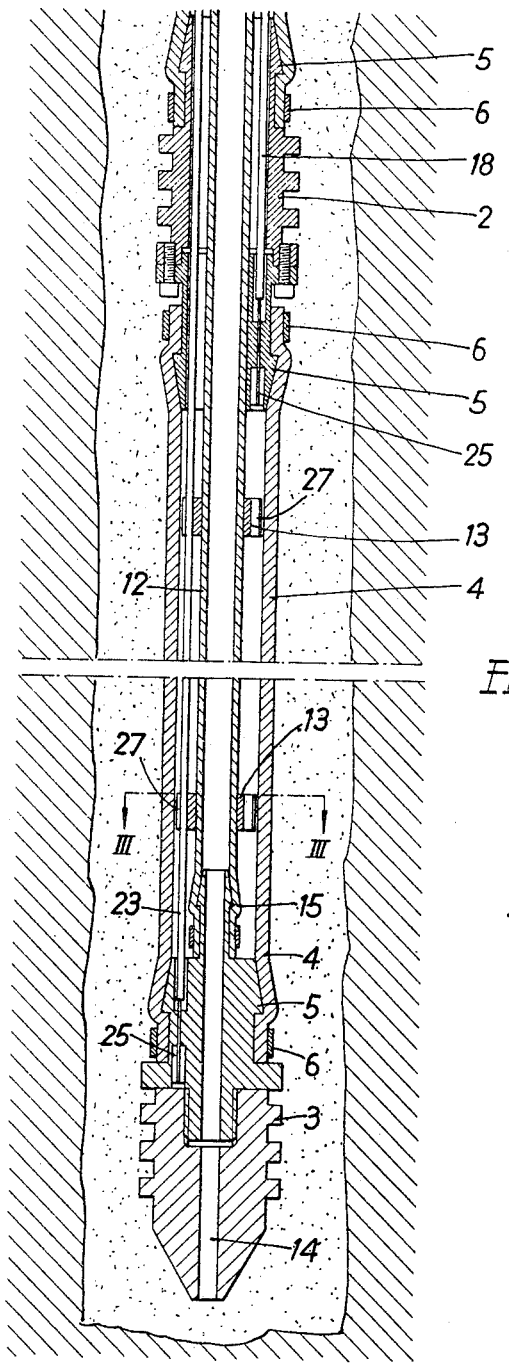
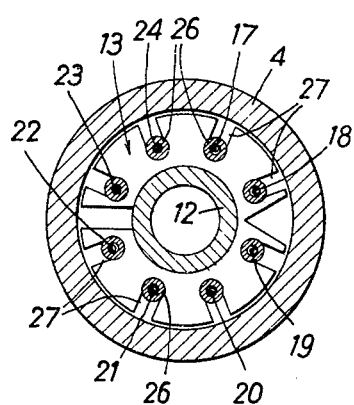
FIG. 2
FIG. 3

3,489,000
BOREHOLE MEASURING CABLE FOR EXTENSOMETERS
Wouter S. C. Hauerkate, Mutschellen, Switzerland, assignor to Losinger & Co. A.G., Bern, Switzerland
Filed July 12, 1968, Ser. No. 744,452
Claims priority, application Switzerland, July 27, 1967, 10,657/67
Int. Cl. G01n 3/00
U.S. Cl. 73—88     3 Claims

ABSTRACT OF THE DISCLOSURE

The invention teaches a borehole measuring cable for extensometers incorporating a plurality of measuring elements which can be anchored in the wall of the borehole and connected with one another by tubular members. A suitable number of measuring wires are provided, each of which is connectable with a respective measuring element and with a measuring apparatus. A retaining ring member is pushed into each tubular member with a sliding fit and rotatable relative thereto. These retaining ring members serve to retain the individual measuring wires which are slidably mounted in sleeve members at a spacing from one another.

BACKGROUND OF THE INVENTION

The present invention relates to an improved borehole measuring cable for extensometers which is of the type comprising a plurality of measuring elements which can be anchored to the wall of the borehole and which are connected with one another by jacket sleeves or tubular members as well as further incorporating a suitable number of measuring wires, each of which, on the one hand, is secured to a measuring element, and, on the other hand, are connectable with a measuring apparatus.

Borehole measuring cables of this general type have already been proposed. However, such have been associated with the disadvantage that the measuring wires, especially when a cable is pushed into the borehole, tend to become entangled with one another or, in any case, do not extend along a straight line between the measuring element up to the measuring apparatus. In particular, owing to this entanglement or the contacting of individual measuring wires with other constructional components of the cable or possibly with the mass of injection material, it was necessary to take into account considerable inaccuracies in the measurement operation.

SUMMARY OF THE INVENTION

Accordingly, it is a primary object of the present invention to provide an improved borehole measuring cable of the mentioned type which prevents the aforementioned drawbacks.

Still a further significant object of the present invention relates to an improved borehole measuring cable which allows for increased measurement accuracy.

In order to implement the foregoing objects and further objects which will become apparent as the description proceeds, the inventive borehole measuring cable is generally manifested by the features that there are provided retaining or support ring members which are inserted into each tubular member with a sliding fit and rotatable with respect thereto. The individual measuring wires slidably mounted within sleeves are individually retained and at a spacing from one another in such retaining or support ring members.

In so doing, the retaining or support ring members can be pushed with a sliding fit onto an inner tube which is coaxial with respect to the jacket or outer tube and further, these ring members are rotatable with respect to the inner tube. In this instance the possibility exists of using this inner tube for the introduction of a mass of injectable material serving to anchor the measuring elements to the wall of the borehole and, in this manner, on the one hand, to prevent any damage of such injection tube which, in the previously known arrangements was situated at the outside of the cable and, at the same time, to protect or screen the measuring wires and the inside of the borehole measuring cable against the entry of the mass of injectable material.

BRIEF DESCRIPTION OF THE DRAWINGS

The invention will be better understood, and objects other than those set forth above, will become apparent, when consideration is given to the following detailed description thereof. Such description makes reference to the annexed drawings wherein:

FIGURE 2 is a sectional view through the remaining portion of the borehole measuring cable; and FIGURE 3 is a cross sectional view of the arrangement shown in FIGURE 2 on an enlarged scale, and taken substantially along the line III—III thereof.

DESCRIPTION OF THE PREFERRED EMBODIMENT

Figure 1:
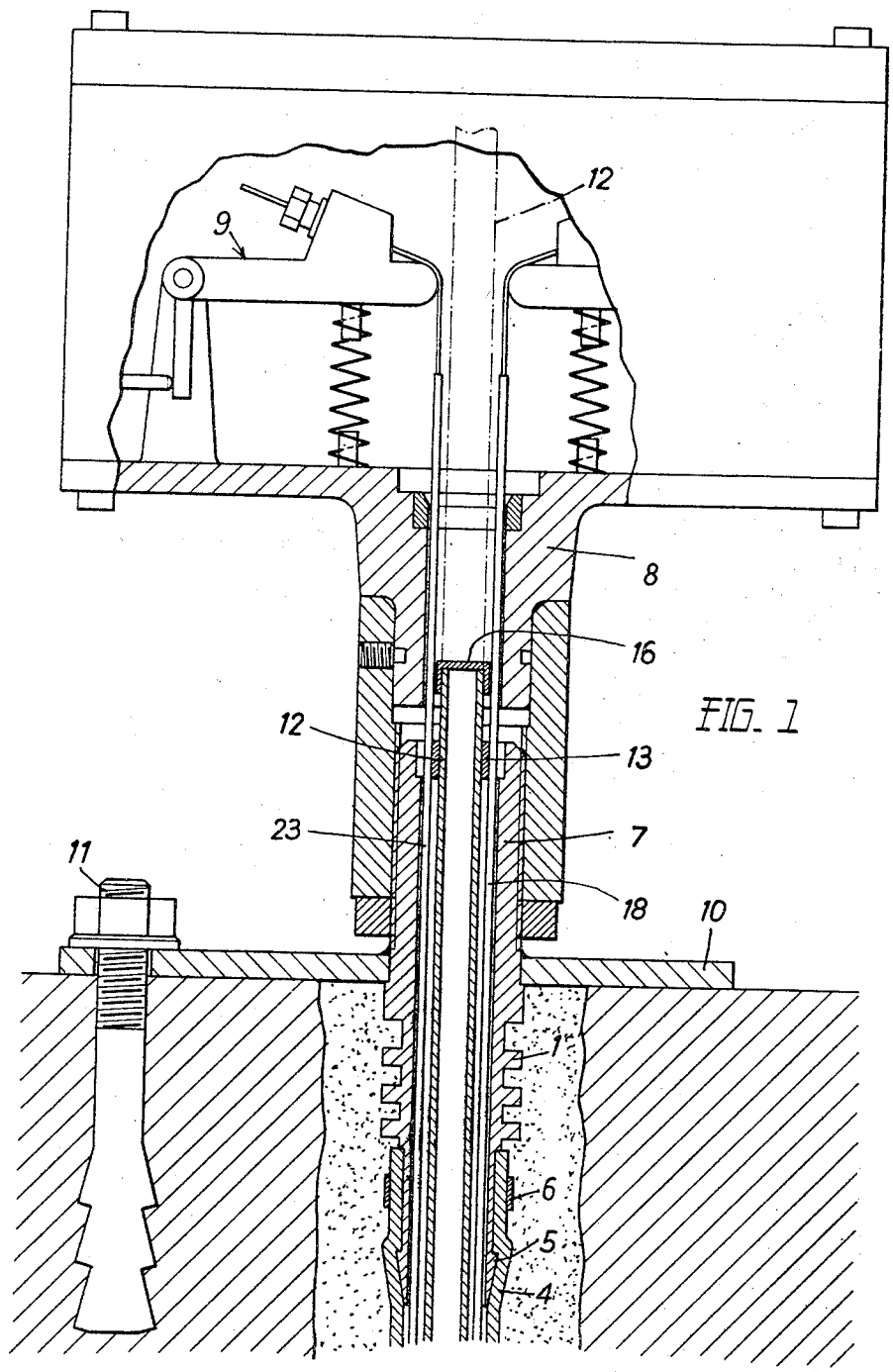
FIGURE 1 is a partial sectional view of the end of the borehole measuring cable which protrudes out of the borehole and further shows the measuring apparatus which is mounted thereon.

Describing now the exemplary illustrated embodiment, it will be understood that the outer jacket or tube structure of the inventive bore hole measuring cable is formed by an anchoring member 1 and a series of measuring elements 2 and 3 having a grooved or profiled external surface. The anchoring member 1 and the measuring elements 2 and 3 are retained at a spacing from one another and simultaneously coupled with one another by means of individual jackets or tubular members 4 formed of deformable material, for instance a suitable plastic. Such connection occurs in such a manner that the ends of the tubular members 4 are pushed over appropriately undercut connecting elements 5 of the anchoring member 1 and the measurement elements 2 and 3 and fixedly clamped by means of suitable clamps 6. The anchoring member 1 possesses a connecting piece of stud 7 having a central bore and which protrudes out of the borehole, as shown. The measuring head 8 together with the measuring device or apparatus 9 is threaded on to this connecting piece 7. A collar or plate 10 which is welded to the connecting piece 7 serves, together with the screw means 11 (only one of which is visible in the drawings), for attachment of the measuring head 8. Extending within the cable jacket or tube arrangement formed by the tubular members 4, the anchoring member 1 and the measuring elements 2 and 3, is an inner tube member 12 likewise formed of a deformable plastic and serves as a filling channel for the mass of injectable material. This inner tube 12 is guided within the cable jacket by retaining or support rings 13. The lowermost measuring element 3 possesses a central bore 14 communicating with the borehole as well as a connecting nipple 15 to which there is secured the lower end of the injection tube 12, as shown. The upper end of this injection tube 12, in its original position, as shown in phantom lines in FIGURE 1, serves as a filling hose for the mass of injection material. After the injection operation has been completed, this filling hose is cut off and the remaining portion of the inner tube 12 is sealed by a cover member 16.

To each of a total of eight measuring elements 2, 3 (in the drawing only two of them are illustrated), there is secured at the inside thereof the end of one of eight measuring wires 17 to 24 in such a way that it is drawn through an appropriate guide of a corresponding measuring element and at its side facing away from the measuring head 8, is provided with a securing or locking head 25, whether the arrangement be undertaken such that the wire end is simply deformed or whether it is provided with a solder bead. These measuring wires 17 to 24 each of which is individually connected with another measuring element, extend within rigid or stiff protective sleeves 26, preferably also formed of plastic. The wires 17 to 24 together with the protective sleeves 26 are individually mounted in radially extending grooves 27 of the retaining ring members 13 and in this manner are held at a spacing from one another. The wires are displaceably retained within the sleeves whereas the retaining ring members 13, on the one hand, as already explained, are pushed so as to have a sliding fit and to be rotatable onto the inner tube 12, and, on the other hand, again with a sliding fit and so as to be rotatable are pushed into each jacket or tube 4, so that these rings can rotate relative to the inner tube 12 as well as also with respect to the associated jacket or tube 4.

Now, if the hose is conducted into the borehole and owing to the flexibility of the individual jackets or tubes 4, the rotational movement of the different measuring elements is not the same, then the measuring wires which are guided in the sleeves extend in the form of a screw line or helix, however, thanks to the protective sleeves, there is no danger that the lengthwise movement of the measuring wires, for the purpose of carrying out the measurement operation, is hampered in any way. Furthermore, there is no possibility that such a hampering of this movement will occur by inwardly protruding portions or elements of the measuring elements or by the mass of injection material which has penetrated into the cable.

Furthermore, with the cable inserted it is possible to exert a pull or tensional force on all of the measuring wires and to thus stretch them since the retaining rings 13 are rotatably arranged within the tubes 4. Accordingly, the possibility exists of achieving ideal measurement conditions in which the measuring or measurement wires are guided along a straight line from their point of attachment at the measuring elements up to the measuring head 8.

An entanglement of the measuring wires is also not to be feared if they are transferred in a tensionless condition since the stiffness of the sleeve members is sufficient to retain the measuring wires between the individual retaining rings at a spacing from one another.

Owing to the arrangement of the retaining or support rings, there is additionally achieved the effect that the cable possesses a rigid or stiff framework or skeleton, so that for the jacket members there can be chosen material of lower mechanical strength, but, however, greater elasticity.

The arrangement of a central inner tube for the introduction of a mass of injection material, in comparison to the present solutions in which the injection tube is introduced into the borehole at the outside of the actual cable, has the advantage that the diameter of the borehole can be retained considerably smaller. This not only results in less effort in producing the borehole, rather additionally allows for a thinner layer of injection material between the measuring members or components and the inner wall of the borehole and, therefore, an indirect anchoring of the measuring members at the ground or rock.

It should be apparent from the foregoing detailed description that the objects set forth at the outset to the specification have been successfully achieved.

Accordingly, what is claimed is:

1. A borehole measuring cable arrangement for an extensometer having a measuring apparatus, comprising a plurality of measuring elements capable of being anchored to the wall of the borehole, tubular members for interconnecting said measuring elements, a plurality of measuring wires each connectable to a respective measuring element and to the measuring apparatus, a sleeve member for each measuring wire and within which each said measuring wire is slidably enclosed, retaining ring means inserted with a sliding fit into each tubular member and rotatable relative thereto, said measuring wires which are slidably enclosed in said sleeve members being individually retained at a spacing from one another by said retaining ring means.

2. A borehole measuring cable arrangement as defined in claim 1, further including inner tube means disposed substantially coaxially with respect to said tubular members, said retaining ring means being supported with a sliding fit upon said inner tube means and rotatable with respect to said inner tube means.

3. A borehole measuring cable arrangement as defined in claim 1, wherein each of said retaining ring means is provided with a plurality of radially extending open slot means for receiving said measuring wires.

References Cited

UNITED STATES PATENTS

| | | | |
|---|---|---|---|
| 3,327,396 | 6/1967 | Waddell | 33—125 |
| 3,380,167 | 4/1968 | Abel et al. | 33—125 |

JERRY W. MYRACLE, Primary Examiner

U.S. Cl. X.R.

33—125